March 7, 1944. K. R. HERMAN 2,343,375
VISCOSITY FLOW CONTROL
Filed Nov. 21, 1938 2 Sheets-Sheet 1

INVENTOR.
KENNETH R. HERMAN
BY Barnes, Kisselle, Laughlin & Rauch
ATTORNEYS

March 7, 1944. K. R. HERMAN 2,343,375
VISCOSITY FLOW CONTROL
Filed Nov. 21, 1938 2 Sheets-Sheet 2

INVENTOR.
KENNETH R. HERMAN
BY
Barnes, Kisselle, Laughlin & Raisch
ATTORNEYS

Patented Mar. 7, 1944

2,343,375

UNITED STATES PATENT OFFICE 2,343,375

VISCOSITY FLOW CONTROL

Kenneth R. Herman, Detroit, Mich., assignor to Vickers, Incorporated, Detroit, Mich., a corporation of Michigan Application November 21, 1938, Serial No. 241,565

7 Claims. (Cl. 137—152.5)

This invention relates to an apparatus for controlling the flow of pressure liquid.

Considerable difficulty has been met in connection with hydraulic machinery by reason of the fact that when a pressure liquid, such as oil, is heated, the viscosity and, consequently, the flow characteristics have a tendency to change. Because of this change in viscosity, it is difficult to adjust certain valves for a constant volumetric flow.

An object of the present invention is to provide a valve mechanism by which the flow of liquid under pressure may be made independent of viscosity of the liquid, providing the liquid is that type which has a substantially constant specific gravity such as oil.

The present invention is based on two discoveries, one, that the rate of discharge of a liquid having a substantially constant specific gravity is constant through an orifice having a relatively small depth irrespective of the changes in the viscosity of the liquid; two, that the rate of discharge of such liquid is effected only to the extent of relative pressure, whether the liquid is discharged freely or into a liquid which has various back pressures. By extended experiments these two propositions have been borne out in actual tests.

Other objects and features of the invention having to do with details of construction and operation of various embodiments of the invention will be brought out in the following specification and claims.

Briefly, the invention has to do with the controlling of the flow of liquid under pressure by restricting a stream of liquid at one point to a relatively small cross section for a relatively short distance of flow and thereby rendering the flow independent of viscosity changes due to temperature changes. In the following description and claims, when a liquid is referred to, it shall be taken to mean such a liquid as oil which, when compared to most other liquids, has a substantially constant specific gravity. The change of the specific gravity of oil with a change in temperature of, for example, 100 degrees Fahrenheit is very minute and practically imperceptible. The present invention utilizes this characteristic of oil in controlling the flow thereof. The efficiency of the present invention is directly proportional to the change in specific gravity or weight per unit volume with change in temperature.

In the description and claims when the "length" of an orifice is referred to, this is to be taken to mean the length in the direction of flow.

Figure 1:
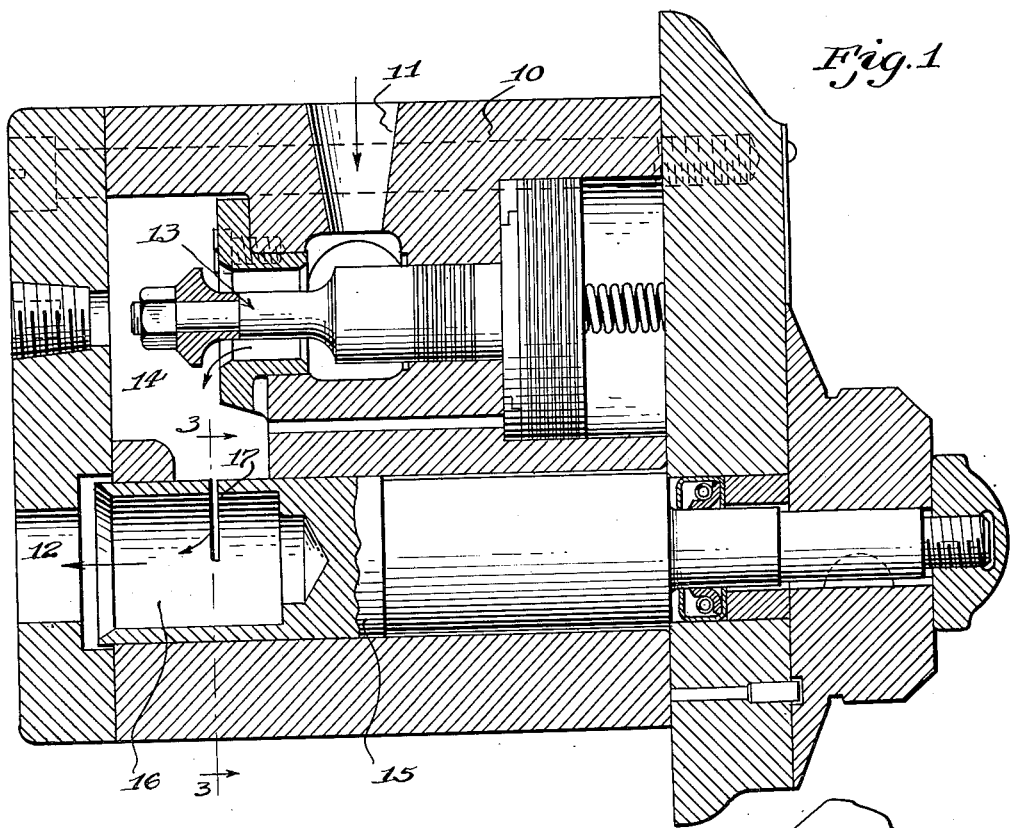
Fig. 1 is a section of a flow control valve illustrating the invention embodied in a throttle.
Figure 3:
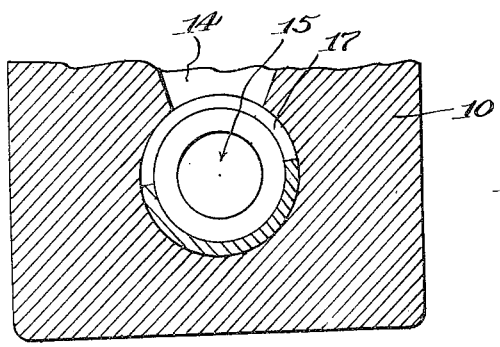
Fig. 3 is a section taken on the lines 3—3 of Fig. 1.
Figure 2:
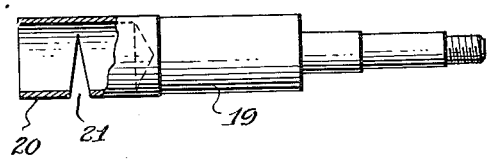
Fig. 2 is a modification of a throttle to be used with the valve housing of Fig. 1.

In Fig. 1, I have shown a flow control valve of the type disclosed in Patent No. 2,272,684 of Feb. 10, 1942, on a Hydraulically actuated member and a speed control therefor. The valve consists of a housing 10, having an inlet 11 and an outlet 12. A pressure control valve 13 is located between the inlet and the outlet to maintain a constant pressure in a chamber 14. A throttle valve 15 is rotatably fitted in a cylindrical opening in the valve housing 10. This throttle valve 15 has an axial opening 16 in one end thereof so that the cylindrical side walls of the valve around the opening 16 are relatively thin. In these side walls is a narrow slit 17. The sectional view, shown in Fig. 3, illustrates the slit 17 more clearly. It will be seen that liquid under pressure will pass from the inlet 11 to chamber 14 and through the slit 17 to the central opening 16 leading to the outlet 12. In Fig. 2 I have shown a substitute throttle valve 19 having a cylindrical opening 20 and a V-shaped slot 21 in the side walls thereof.

Figure 5:
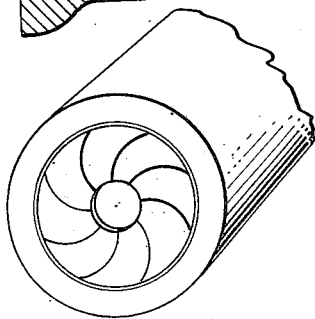
Fig. 5 is a diagrammatic view of an iris type of orifice which may be used to carry out the principles of the invention.
Figure 4:
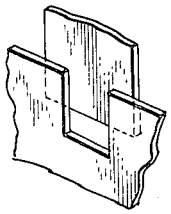
Fig. 4 is a diagrammatic perspective view of a gate valve which may be used to carry out the principles of the invention.

Figs. 4 and 5 illustrate other types of thin orifices which may also be utilized to carry out the principles of the present invention. In Fig. 4 is a diagrammatic illustration of a gate valve which is made of thin material so that the proper results may be accomplished. In Fig. 5 is shown an iris type of orifice which has also been found successful. Other types of orifices may be used, the one requirement being that the walls of the orifice through which the liquid flows, be relatively thin. Extensive experiments have been performed in the course of the development of this invention, and it has been found that the walls at the margin of the orifice should not be over ⅛ of an inch in thickness in order to achieve the results as described. For example, in Fig. 1, the walls of the valve 15 which surround the cylindrical recess 16 should be ⅛ of an inch thick or less. Similarly, the width of the slit 17, which is variable in area by rotation of the valve member 15, should bear a proportional relation to the thickness of the walls at the margin of the orifice. In other words, the area of the opening and the thickness of the walls must be to a certain degree proportional. The larger the opening, the thicker the walls can be and still retain the proper flow effect.

A thin edge orifice is sometimes referred to as an orifice having margins or a flow length which is not greater than one-fourth of the square root of the cross-sectional area thereof. This is the type of orifice illustrated in the drawings.

Figure 6:
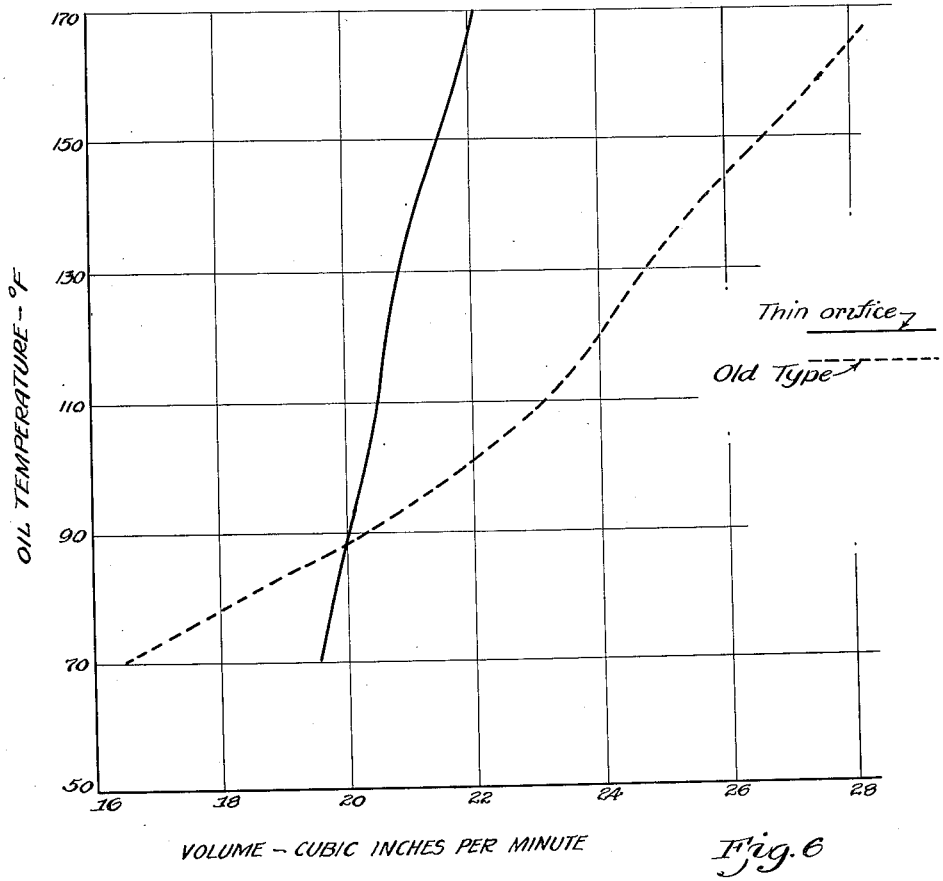
Fig. 6 is a graph showing the results of tests with throttle valves of the old and new types.

In Fig. 6, I have shown some temperature-volume curves which illustrate the superior performance resulting from a thin walled orifice. A flow control valve, such as that shown in Fig. 1, was tested first with an old type of valve and next with the new type of valve. The old type of valve is the type shown in Patent No. 2,272,684 of Feb. 10, 1942, and the new type of valve is similar to that shown in Fig. 1 or 2. A gauge pressure of 600 pounds per square inch was maintained by a vane pump and oil was passed through the valve at varying temperatures. The heating was accomplished by an electric heating element in the oil reservoir. As indicated by the curve, both valves were calibrated for 20 cubic inches at 90° F. and 100 pounds pressure. The temperature was varied from around 70° to 170° F. With the old type of valve it will be seen that the volume flow through the valve increased very rapidly with the increase in temperature as shown by the dotted line on the graph. In contrast to this, the new type of valve with the thin wall or shallow depth orifice showed very little increase in volume flow with the 100° increase in temperature. This is shown by the solid line on the graph.

Another preferred feature of the orifices used is that they have sharp edges since it has been found that better results are obtained with a sharp edge orifice. From the graph in Fig. 6, it will be seen that in accordance with the present invention a throttle having sharp edges and having a relatively shallow or thin wall structure at the margin of the orifice will afford an extremely accurate control means for oil which is subject to changes in viscosity due to increased temperature or other reasons. It has also been found that the thin walled orifice is equally satisfactory whether the liquid is discharged therefrom into the atmosphere or whether there is a back pressure. By extended experiments it has been found that when liquid is discharged from these thin orifices the control is unaffected by the back pressure so that the rate of flow through the orifice is that which would be expected if the orifice were free and the pressure of the liquid flowing through the orifice were equal to the difference between the back pressure and the pressure in front of the orifice.

What I claim is:

1. A flow control device for controlling the flow of a pressure liquid independent of changes in the viscosity of said liquid which comprises a housing having a restricted opening therein characterized by a relatively small length, compared to its cross section, and a regulator for maintaining a substantially constant pressure drop across the opening.

2. A flow control device for controlling the flow of a pressure liquid independent of changes in the viscosity of said liquid due to temperature changes which comprises a housing having a restricted sharp-edged opening characterized by a relatively small length dimension compared to its cross section, and a regulator for maintaining a substantially constant pressure drop across the opening.

3. A flow control valve for controlling the flow of pressure liquid independent of changes in viscosity comprising a housing of the type having an inlet, outlet, and a pressure control valve therebetween, and a variable outlet flow control valve in said housing comprising a thin-walled cylinder having a sharp-edged orifice and adapted to be moved to connect said inlet to said outlet through said orifice.

4. A flow control valve for controlling the flow of pressure liquid independent of changes in viscosity comprising a housing of the type having an inlet, outlet, and chamber therebetween, a pressure control valve in said housing adapted to maintain a constant pressure in said chamber, and a variable outlet flow control valve in said housing between said chamber and said outlet comprising a thin-walled cylinder having a sharp-edged orifice, said cylinder being rotatable whereby the effective area of said orifice may be varied.

5. A flow control valve for controlling the flow of pressure liquid independent of changes in viscosity comprising means for maintaining a constant differential across a regulable flow restriction, and means including a thin edged orifice forming a part of said valve at the exit end to avoid any changes in flow as affected by viscosity variations.

6. A flow control device for controlling the flow of a pressure liquid independent of changes in the viscosity of said liquid which comprises a housing having an inlet and an outlet, means between said inlet and outlet adapted to serve as a flow control for liquid under pressure comprising a relatively thin plate having a relatively sharp-edged opening therein, and a second plate adapted to be slidably positioned adjacent said first plate to permit adjustment of the effective area of said orifice, and a regulator for maintaining a substantially constant pressure drop across the orifice.

7. A flow control device for controlling the flow of a pressure liquid independent of changes in the viscosity of said liquid which comprises a housing having an inlet and an outlet, means between said inlet and outlet adapted to serve as a flow control for liquid under pressure comprising a plurality of relatively thin members arranged around a central point to form a sharp-edged orifice, said members being movable to adjust the size of said orifice, and a regulator for maintaining a substantially constant pressure drop across the orifice.

KENNETH R. HERMAN.